Inventor
Alfred Booth
by Sommers & Young
Attorneys

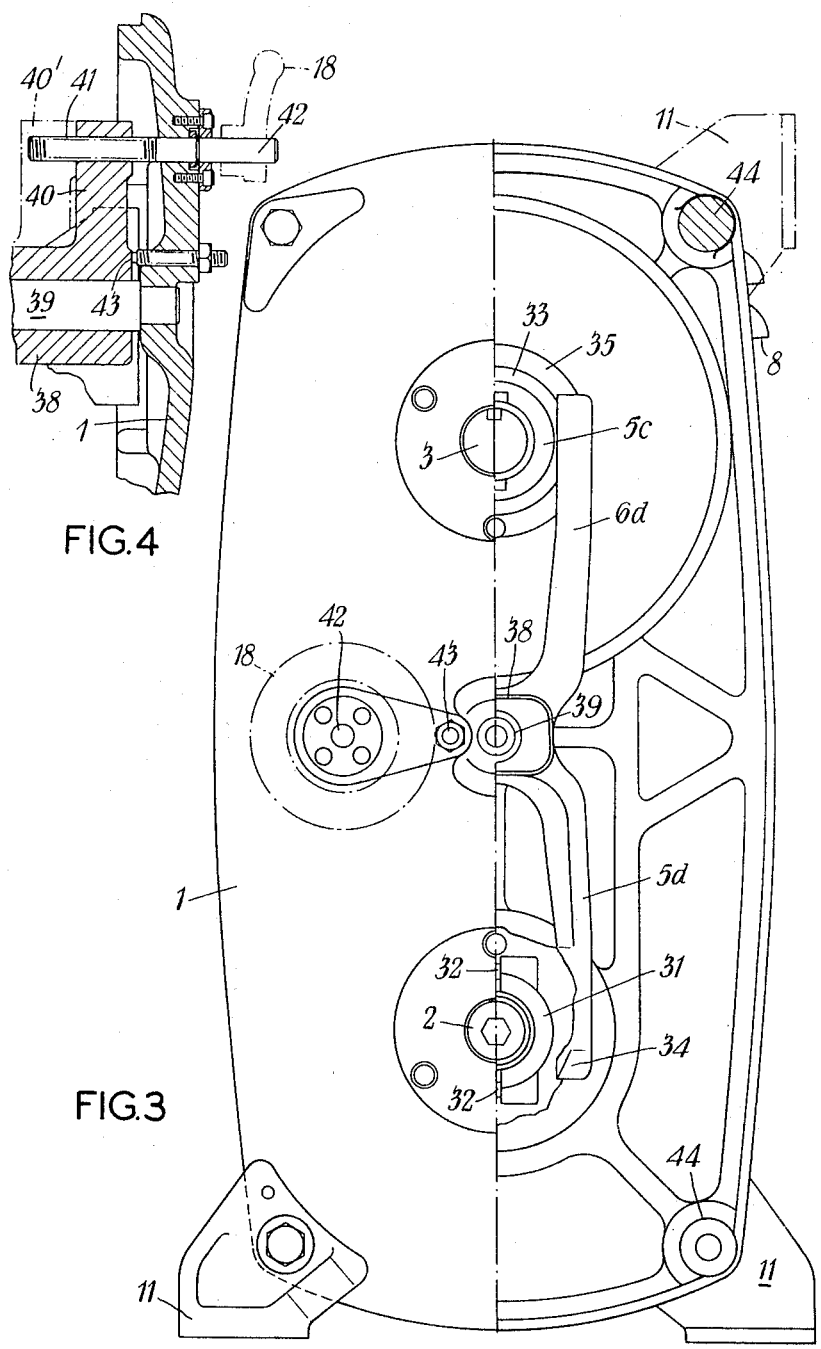

United States Patent Office 3,293,929
Patented Dec. 27, 1966

3,293,929
VARIABLE-SPEED BELT GEARING
Alfred Booth, London, England, assignor to Stone-Wallwork Limited, London, England
Filed Apr. 13, 1964, Ser. No. 359,094
Claims priority, application Great Britain, Apr. 26, 1963, 16,571/63
5 Claims. (Cl. 74—230.17)

This invention concerns improvements relating to variable-speed frictional V-belt gearing of the kind in which the gear ratio is variable by adjusting oppositely the axial separation of the cone faces of the two pulleys around which the belt runs. An object of the invention is to provide a simple but efficient form of such gearing, which is also easy to control, install and maintain.

With gearing of this kind, if the cone faces are strictly conical, the length of the belt path will not remain the same upon equal but opposite adjustments of the separation of the cone faces of the two pulleys. Consequently the tension on the belt will vary upon such adjustment. The invention seeks to remedy or compensate for this drawback.

According to the invention, in V-belt gearing of the kind set forth, the belt-engaging cone faces of at least one pulley have a slight convex curvature such that the length of the belt path is constant for all positions of adjustment of the pulleys. By this means, it can be ensured that the belt is neither over nor under stressed in any position and an effective tension can readily be maintained.

In a preferred arrangement for effecting control of the gear ratio of such a gearing, slidable cone faces of the two pulleys are shifted axially in the same direction by means of arms carried upon a sleeve which is displaceable by screw means along a shaft mounted between the shafts of the pulleys. Preferably, the arms are fast with the sleeve which is slidable on its shaft by means of a control shaft having screw-thread engagement with the sleeve. Advantageously, the arms engage the slidable cone faces by way of thrust members adjustable axially on the said cone faces. The belt tension is then adjustable by axial adjustment of the said members.

Figure 1:
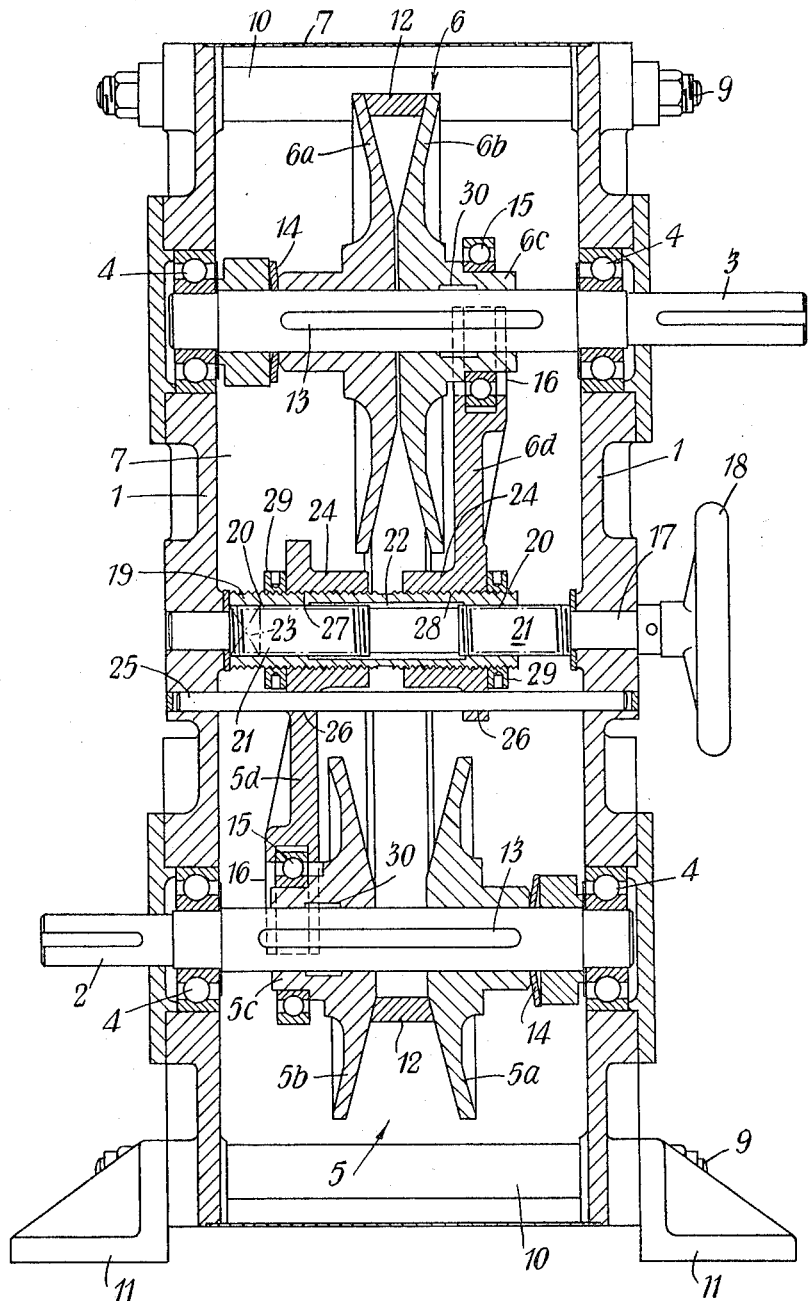
Figure 2:
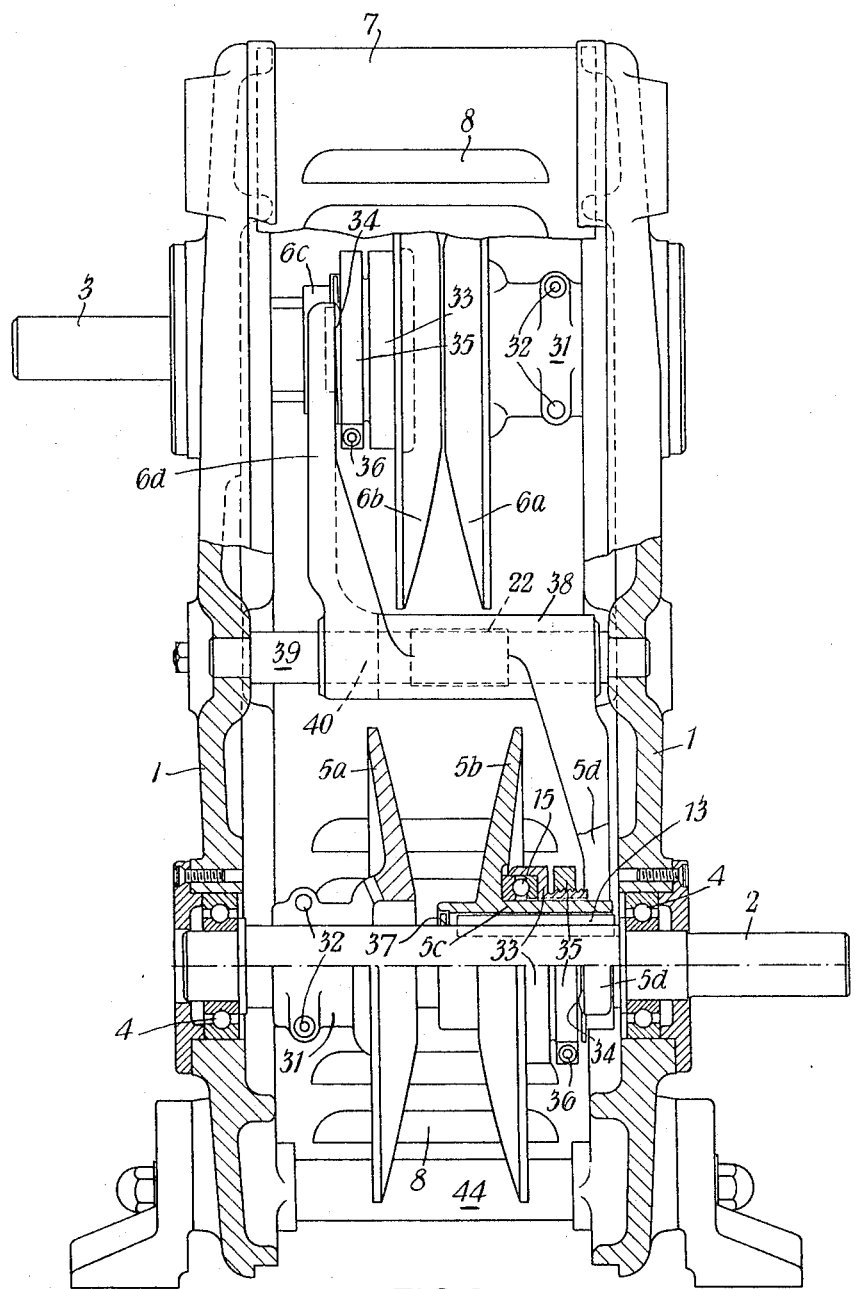

Two forms of embodiment of the invention by way of example will now be more fully described with reference to the accompanying drawings, in which:

FIGURE 1 is a vertical section through one form of embodiment,

FIGURE 2 an elevational view of the other form of embodiment with various parts broken away or shown in section for the purposes of clearer illustration, FIGURE 3 is a side view of the gearing of FIGURE 2, with the right-hand half of a side wall of its housing cut away, and FIGURE 4 an underneath view of a detail of the gearing of FIGURE 2.

Referring to the embodiment of FIGURE 1, the whole gearing is enclosed in a box-like housing comprising two robust side walls 1 in which the parallel input and output pulley shafts 2, 3, projecting from opposite sides, are mounted by means of ball bearings 4, suitably of grease-retaining type. The housing forms a dry chamber for the pulleys 5, 6, its other walls being closed by sheet-metal covers 7, of which the vertical panels are provided with louvers (such as are shown at 8 in the example of FIGURES 2 to 4) to permit free circulation of air, while obstructing ingress of dust. The walls 1 are braced against each other at the corners by rods 9 passing through wall-spacing sleeves 10. The housing is adapted for being mounted by means of detachable feet 11 either in a horizontal position with the shafts 2, 3 in the same horizontal or vertical plane or in a vertical position, as illustrated with the shafts horizontal and in the same vertical plane. The housing can also readily be adapted for the attachment of other components, such as flange-mounted motors or subsidiary gearing or driving means. For example, an electric motor may be mounted by means of a spider-like adaptor bolted to the left-hand wall 1 over the shaft 2. Thus a standard construction of gearing unit can readily be used in a variety of layouts.

Axially fixed cone faces 5a, 6a and slidable cone faces 5b, 6b of the two pulleys 5, 6 are respectively on opposite sides of the V-belt 12. They are coupled to the shafts 2, 3 by double keys 13. The fixed cone faces 5a, 6a are abutted through dished-spring washers 14 which allow slight flexibility during speed-change operations. On each of the slidable cone faces 5b, 6b an outwardly extended hub 5c, 6c is embraced through a ball bearing 15 by the forked end 16 of a shift arm 5d, 6d forming part of control means now to be described.

The control means comprises a control shaft 17 mounted, in rotatable but axially immovable manner, in the walls 1 parallel to and midway between the shafts 2, 3 and having a handwheel 18 fast on one end. A sleeve 19 embracing the shaft 17 between the walls 1, but shorter than the distance between them by the amount of the required movement of the cone faces 5b, 6b, has at its ends lengths of internal screw thread at 20, of the same hand, by which it is engaged with lengths, of greater extent, of screw thread 21 on end portions of the shaft. A cavity 22 in the sleeve 19 may be packed with grease. At the end of the sleeve 19 remote from the handwheel 18, two flats are machined on the sleeve, as indicated at 23. The shift arms 5d, 6d are mounted on the sleeve 19 by means of inwardly extended, internally threaded, hubs 24 and are guided by a rod 25 fixed in the walls 1 and passing through holes 26 in the arms. The sleeve is provided with two lengths of external screw thread 27, 28, of opposite hand, which are engaged by the hubs 24 and by lock nuts 29 against which the said hubs are axially abutted on the outside.

By turning the shaft 17 by the handwheel 18, located conveniently midway between the shafts 2, 3, the sleeve 19 and the arms 5d, 6d can be displaced bodily, all in the same direction, for shifting the cone faces 5b, 6b and changing the gear ratio. For the initial setting of the cone faces 5b, 6b, the nuts 29 are slackened and the sleeve 19 is turned in relation to the hubs 24, using the flats 23, so that the said cone faces are adjusted in relation to each other and to the fixed cone faces 5a, 6a. By this means, the belt tension can be set as required or readjusted after wear has occurred. The adjustment is then locked by the nuts 29.

The belt-engaging surfaces of the cone faces 5a, 5b, 6a, 6b are made with a slight convex curvature designed to compensate for the variation of the length of belt path which would otherwise occur with different positions of the movable cone faces 5b, 6b, so that effective belt tension can be maintained.

To a close approximation, the following equation is true:

$$L = 2C + \frac{\pi}{2}(D+d) + \frac{(D-d)^2}{4C}$$

where:

L is the length of the belt path, which is to be kept constant,

C is the fixed distance between the axes of the two pulleys, and

D, d are the diameters, for the large and small pulleys respectively, of the circles where the belt will engage the pulleys (these circles will be taken at the midwidth of the annular zone engaged by the belt in practice).

Thus for every value of D, a corresponding value of d which will give a constant length L of belt path can be determined. Accordingly, having predetermined the cone angle of the pulley faces for one particular belt position, for example the mean position, the required value of d can be determined for a series of positions and, bearing in mind that, on adjustment, the cone faces of one pulley approach each other by the same amount as those of the other pulley separate, a curve representing the shape of the cone faces of the small pulley can be plotted. In this case, the required variation from strict conical shape will all appear on the small pulley. Preferably, however, the variation will be distributed equally between the two pulleys. If a high degree of accuracy is required, this can be obtained by the method of successive approximation, using the above equation.

The hubs 5c, 6c of the sliding cone faces 5b, 6b are shown with cavities 30 for holding a supply of grease which can be fed from central holes in the respective shafts 2, 3. Alternatively the parts of the shafts on which the said cone faces slide may be coated with a layer of nylon impregnated with disulphide, which reduces friction, avoids the necessity for lubrication and prevents fretting corrosion on the shafts.

In the embodiment illustrated by FIGURES 2 to 4, which will usually be preferred to that of FIGURE 1, the general arrangement of the gearing is the same. The following description will therefore be directed mainly to points of significant difference.

The fixed cone faces 5a, 6a have each a diametrically divided hub 31 which is clamped by bolts 32 upon the respective shaft 2, 3, so that it is rigidly held on the shaft with a frictional grip. The bearing 15 associated with each of the slidable cone faces 5b, 6b is arranged as an axial thrust bearing in a housing 33 which is disposed, with a certain freedom of tilting movement, around the respective hub 5c, 6c. The fork ends of the arms 5d, 6d act upon the respective cone faces 5b, 6b by way of rounded elevations 34 bearing upon radially divided thrust members 35 each of which is adjustably screwed upon a hub portion of the adjacent housing 33 and is clamped in the adjusted position by a screw 36. Each housing 33, due to the aforesaid freedom of movement, can float, i.e. adjust itself to the direction of the thrust loading, and thus ensure more uniform loading of the bearing 15. The hubs 5c, 5d have grease chambers in their bores with oil seals 37 at one end.

The arms 5d, 6d are integral with a single hub 38 which is slidable on a plain spindle 39 mounted in the walls 1. The hub 38 is also formed with a short arm 40 (FIGURE 4) extending at right angles to the arms 5d, 6d. The arm 40 has a threaded hole engaged by a threaded portion 41 of a small shaft 42 which is mounted in the adjacent wall 1 so as to be rotatable, by means of a hand-wheel 18, but not axially displaceable. The hub 38 is shown in full in FIGURE 4 in one end position limited by an adjustable stop 43, but it can be shifted axially, together with the arms 5d, 6d by turning the shaft 42. The other end position 40' of the arm 40 is indicated by chain lines. As in the embodiment of FIGURE 1, the hand wheel 18 is again midway between the shafts 2, 3 although offset from the centre line connecting them.

The procedure for setting up the gearing of FIGURES 2 to 4 is as follows: The fixed cone faces 5a, 6a are positioned on the shafts 2, 3 and secured by tightening the bolts 32. The belt is placed between the cone faces 5a, 5b and 6a, 6b and tension is applied to it by adjusting the members 35, bearing against the arms 5d, 6d, axially in relation to the hubs 5c, 6c, the adjustment being secured by the screws 36. Re-adjustment of the belt tension after wear can be similarly effected. Adjustment of the gear ratio is effected simply by turning the handwheel 18 so as to displace the hub 38, arms 5d, 6d and cone faces 5b, 6b, all in the same direction.

The feet 11 are detachably mounted on the ends of wall-spacing rods 44. If the gearing is to be used in a horizontal position, the feet may be attached in the alternative position shown in chain lines at the top right-hand corner of FIGURE 3.

I claim:
1. A gearing comprising two adjustable pulleys with belt-engaging cone faces, the said faces of at least one said pulley having a slight convex curvature such that the length of the belt path is constant for all positions of adjustment of the pulleys, pulley shafts upon which slidable cone faces of the two pulleys are shiftable axially, a shaft mounted between the said pulley shafts, a sleeve disposed upon the last-named shaft, screw means for displacing the said sleeve along the last-named shaft, axially adjustable thrust members, including arms carried upon the said sleeve and operably connected with the said cone faces for shifting the latter axially in the same direction.

2. A gearing according to claim 1, wherein the said thrust members engage the said slidable cone faces by way of thrust rolling bearings, the side of each said bearing towards the respective thrust member having freedom of tilting movement in relation to the slidable cone face, so that it can adjust itself to the direction of thrust loading.

3. A gearing comprising two adjustable pulleys with belt-engaging cone faces, the said faces of at least one of said pulleys having a slight convex curvature such that the length of the belt path is constant for all positions of adjustment of the pulleys, pulley shafts upon which slidable cone faces of the two pulleys are shiftable axially, a control shaft mounted between the said pulley shafts, a sleeve disposed upon the said control shaft, and having screw-threaded engagement therewith for the displacement of the said sleeve along the said control shaft, and arms carried upon the said sleeve and operably connected with the said cone faces for shifting the latter axially in the same direction.

4. A gearing according to claim 3, wherein the said arms are adjustable axially of the said sleeve.

5. A gearing according to claim 3, wherein a fixed cone face of each pulley is arranged to bear against a resilient abutment.

References Cited by the Examiner

UNITED STATES PATENTS

| | | | |
|---|---|---|---|
| 583,402 | 5/1897 | Reeves | 74—230.17 |
| 2,893,254 | 7/1959 | Grover | 74—230.17 |
| 3,146,628 | 9/1964 | Diehl et al. | 74—230.17 |

FOREIGN PATENTS

| | | |
|---|---|---|
| 1,038,820 | 5/1953 | France. |

DAVID J. WILLIAMOWSKY, *Primary Examiner.*

L. H. GERIN, *Assistant Examiner.*